US009412574B2

(12) United States Patent
Koeppen et al.

(10) Patent No.: US 9,412,574 B2
(45) Date of Patent: Aug. 9, 2016

(54) PARALLEL ELEMENTAL AND MOLECULAR MASS SPECTROMETRY ANALYSIS WITH LASER ABLATION SAMPLING

(71) Applicant: WESTFAELISCHE WILHELMS-UNIVERSITAET MUENSTER, Muenster (DE)

(72) Inventors: Christina Koeppen, Muenster (DE); Olga Reifschneider, Schemmerhofen (DE); Christoph Alexander Wehe, Bremen (DE); Michael Sperling, Muenster (DE); Uwe Karst, Muenster (DE)

(73) Assignee: WESTFAELISCHE WILHELMS-UNIVERSITAET MUENSTER, Muenster (DE)

( * ) Notice: Subject to any disclaimer, the term of this patent is extended or adjusted under 35 U.S.C. 154(b) by 0 days.

(21) Appl. No.: 14/763,520

(22) PCT Filed: Jan. 28, 2014

(86) PCT No.: PCT/EP2014/051559

§ 371 (c)(1),
(2) Date: Jul. 27, 2015

(87) PCT Pub. No.: WO2014/114803

PCT Pub. Date: Jul. 31, 2014

(65) Prior Publication Data

US 2016/0005578 A1 Jan. 7, 2016

Related U.S. Application Data

(60) Provisional application No. 61/757,248, filed on Jan. 28, 2013.

(51) Int. Cl.
*H01J 49/10* (2006.01)
*H01J 49/00* (2006.01)
(Continued)

(52) U.S. Cl.
CPC .......... *H01J 49/0463* (2013.01); *H01J 49/009* (2013.01); *H01J 49/0031* (2013.01); *H01J 49/105* (2013.01); *H01J 49/107* (2013.01)

(58) Field of Classification Search
USPC ................ 250/281–283, 286–288, 290, 292, 250/423 R, 424, 423 P
See application file for complete search history.

(56) References Cited

U.S. PATENT DOCUMENTS 5,663,561 A 9/1997 Franzen et al.
7,045,777 B2 * 5/2006 Cotter ................ H01J 49/0013 250/281

(Continued)

FOREIGN PATENT DOCUMENTS

EP 2 363 877 A1 9/2011
GB 2 299 445 A 10/1996

(Continued)

OTHER PUBLICATIONS

E. R. Denoyer et al.: "Laser Solid Sampling for Inductively Coupled Plasma Mass Spectrometry", Analytical Chemistry, vol. 63, No. 8, pp. 445-446, 448-450, 452-457 (1991).

*Primary Examiner* — Bernard Souw
(74) *Attorney, Agent, or Firm* — Norman B. Thot

(57) ABSTRACT

An apparatus for mass spectrometry includes a laser ablation sampler comprising a laser ablation chamber and a laser which produces a laser beam. The laser irradiates and ablates a material from a sample placed within the laser ablation chamber so as to generate an ablated sample material. A transfer tube system comprising transfer tubes connect the laser ablation sample with, and provides a parallel and simultaneous transport of the ablated sample material to, each of a soft and a hard ionization source. The soft and hard ionization sources interact with the ablated sample material to respectively generate ion populations having a mass-to-charge ratio distribution. These respective mass-to-charge ratio distributions are respectively transmitted to a molecular mass spectrometer and to an elemental mass spectrometer which provide information on the mass-to-charge ratio distribution. The mass-to-charge ratio distributions are used to characterize a composition of the ablated sample material.

19 Claims, 3 Drawing Sheets

(51) Int. Cl.
*B01D 59/44* (2006.01)
*H01J 49/04* (2006.01)

(56) References Cited

U.S. PATENT DOCUMENTS 8,013,296 B2 * 9/2011 Wollnik ................ H01J 49/067 250/281
9,164,060 B2 * 10/2015 Campbell ........... H01J 49/0031
2005/0161595 A1 * 7/2005 Cotter ................. H01J 49/0013 250/290
2009/0189073 A1 7/2009 Yamaguchi
2009/0272893 A1 11/2009 Hieftje et al.
2010/0148062 A1 * 6/2010 Wollnik ................ H01J 49/067 250/288
2012/0149009 A1 6/2012 Levis et al.
2015/0129762 A1 * 5/2015 Campbell ........... H01J 49/0031 250/283
2015/0357171 A1 * 12/2015 Tang ....................... C23C 14/35 204/192.12

FOREIGN PATENT DOCUMENTS

JP 2005-353340 A 12/2005
WO WO 2011/022364 A1 2/2011

* cited by examiner

PARALLEL ELEMENTAL AND MOLECULAR MASS SPECTROMETRY ANALYSIS WITH LASER ABLATION SAMPLING

CROSS REFERENCE TO PRIOR APPLICATIONS

This application is a U.S. National Phase application under 35 U.S.C. §371 of International Application No. PCT/EP2014/051559, filed on Jan. 28, 2014 and which claims benefit to U.S. Provisional Patent Application No. 61/757,248, filed Jan. 28, 2013. The International Application was published in English on Jul. 31, 2014 as WO 2014/114803 A2 under PCT Article 21(2).

FIELD

The present invention relates to an apparatus for performing mass spectrometry and to a method for analyzing a solid sample through mass spectrometry using the apparatus. The present invention in particular relates to an apparatus capable of ambient mass spectrometry and mass spectral imaging and a method therefor. The apparatus includes three subunits, a laser ablation unit, an elemental mass spectrometer with a hard ionization source for inorganic mass spectrometry, and an organic mass spectrometer with a soft ionization source. While the laser ablation sampler is used to ablate material from the surface of a sample, the generated ablated sample is divided through a transfer tube system with a flow-splitter and transported in parallel to the two mass spectrometers being operated simultaneously. Both the molecular mass spectra as well as the elemental mass spectra obtained from the same ablated sample can then be used to characterize the ablated sample material with respect to its composition.

BACKGROUND

The focus of attention in recent years has been on imaging mass spectrometry (IMS), particularly with high spatial resolution with the objective of analyzing μm- or even sub-μm scale structures such as cell organelles.

Laser ablation combined with inductively coupled plasma mass spectrometry (LA-ICP-MS) can be used for trace element mapping. This, however, only provides spatial resolution limited by the laser sampling spot size and the analyte concentration.

The ICP ion source is also an atomizer which destroys all molecular information. For molecular mass spectrometry, another technique called matrix-assisted laser desorption ionization (MALDI) has been developed. This method requires a delicate chemical and physical sample manipulation which prevents the study of live specimens. This technique requires, for example, that a matrix substance be applied to the sample surface to facilitate the desorption process of the analyte molecules from the surface. The method, which is particularly successful for thin tissue sections, requires that a relatively thick, very uniform layer of matrix material to be applied, for example, by spraying as a solution in individual layers. The matrix material must further be selected to interact with the wavelength of the laser, and must be suitable to support the desorption of the target analyte molecules. A disadvantage of the applied matrix layer is the loss of lateral spatial resolution. In order to benefit from the possible spatial resolution of laser sampling, the deteriorating washing effect by the applied matrix must be avoided.

While the laser ablation system for LA-ICP-MS is a unit that is connected to the ICP-MS via a transfer line, the laser desorption unit of an MALDI-MS must be placed at a very short distance to the sampling interface of the mass spectrometer. Since the distance between the sample surface and the sampling interface of the mass spectrometer is critical, a dedicated MALDI-MS instrument, or at least a dedicated source incorporating the laser desorption, is required.

Another technique, termed laser ablation electrospray ionization (LAESI), requires no sample pretreatment, can operate at atmospheric pressure, and offers the potential of depth information. In this technique, laser ablation using a mid-IR laser removes material from a surface and electrospray ionization (ESI) is used to directly ionize molecules from the ablation plume. At least the ionization source is here also a dedicated construction incorporating the laser sampler.

Existing techniques for laser ablation/desorption for molecular mass spectrometry require dedicated instruments or at least dedicated sources incorporating the laser desorption unit in very close connection to the sample entrance of the mass spectrometer. Possibilities for quantification are limited because the sensitivity of these techniques is dependent on the analytes used, and on the matrix and topography of the sample. LA-ICP-MS does, however, provide good possibilities to quantify an elemental composition.

Another hot topic in mass spectrometry is the simultaneous acquisition of both molecular and elemental information for structure elucidation and elemental composition quantification. While past use of ICP-MS and ESI-MS focused on the competition of the two techniques, the complementary information gained by the two techniques was subsequently valued. The first parallel and simultaneous use of two types of mass spectrometers was realized for sample introduction by means of high pressure liquid chromatography (HPLC), and has since then has been used by many researchers. The parallel use of two mass spectrometers has since been realized for gaseous samples being eluted from a gas chromatograph. Special routines to compare, synchronize, and merge the data from the two mass spectrometers have been developed. The integration of two types of mass spectrometers for the quasi-simultaneous acquisition of atomic and molecular mass spectra has also previously been described.

SUMMARY

An aspect of the present invention is to provide a system which can acquire elemental and molecular mass information from the same sample location being probed with a laser ablation sampler and thereby characterize a composition of the sample material. An additional aspect of the present invention is to provide a method using the inventive system.

In an embodiment, the present invention provides an apparatus for mass spectrometry which includes a laser ablation sampler comprising a laser ablation chamber and a laser configured to produce a laser beam. The laser ablation chamber is configured so that the laser can irradiate and ablate a material from a sample placed within the laser ablation chamber so as to generate an ablated sample material. A molecular mass spectrometer comprising a molecular mass spectrometer entrance is operatively connected with a soft ionization source. An elemental mass spectrometer comprising an elemental mass spectrometer entrance is operatively connected with a hard ionization source. A transfer tube system comprises connecting tubes configured to connect the laser ablation sampler with, and to provide a parallel and simultaneous transport of the ablated sample material to, each of the soft ionization source and the hard ionization source. The soft ionization source interacts with the ablated sample material to generate a first ion population having a first mass-to-charge ratio distribution. The first ion population is transmitted to the molecular mass spectrometer via the molecular mass spectrometer entrance so that the molecular mass spectrometer provides information on the first mass-to-charge ratio distribution. The hard ionization source interacts with the ablated sample material to generate a second ion population having a second mass-to-charge ratio distribution. The second ion population is transmitted to the elemental mass spectrometer via the elemental mass spectrometer entrance so that the elemental mass spectrometer provides information on the second mass-to-charge ration distribution. The first mass-to-charge ratio distribution obtained from the molecular mass spectrometer and the second mass-to-charge ratio distribution obtained from the elemental mass spectrometer are each used to characterize a composition of the ablated sample material. The distance of the laser unit to the mass spectrometers is thereby not critical with respect to a couple of meters.

BRIEF DESCRIPTION OF THE DRAWINGS

The present invention is described in greater detail below on the basis of embodiments and of the drawings in which.

DETAILED DESCRIPTION

Figure 1:
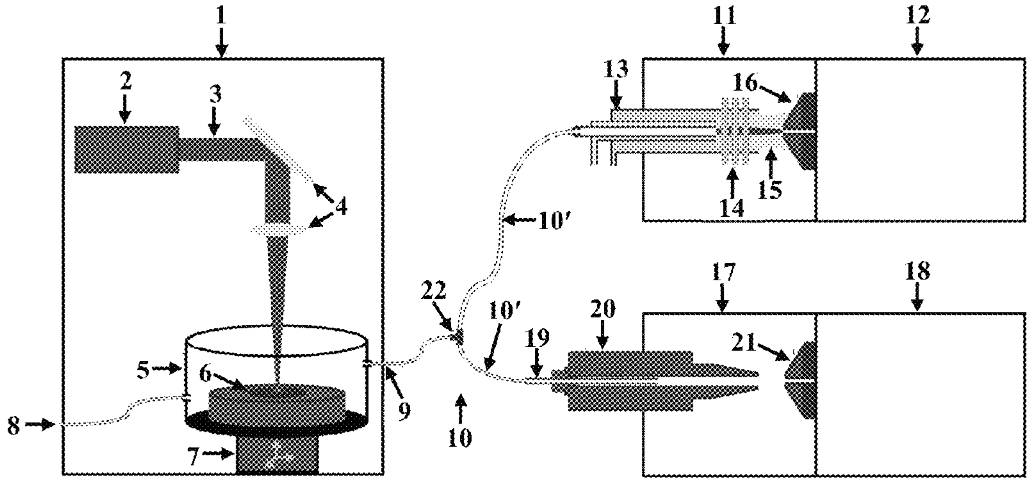
FIG. 1 shows a schematic diagram of a setup of the LA/API-MS/IPC-MS apparatus of the present invention.

Various lasers can be used for the laser ablation process of the present invention. The laser can, for example, differ in terms of the wavelength of the emitted light. In an embodiment of the present invention, the laser can, for example, operate in an ultra-violet (UV) wavelength range, an infrared (IV) wavelength wave, and/or in a visible wavelength range. The mode of emission can, for example, be pulsed and/or continuous. In an embodiment of the present invention, the laser can, for example, comprise a pulsed mode of emission operating in a femtosecond range, a picosecond range, or in a nanosecond range. The pulse frequency can, for example, be in the range of 1-20 Hz, for example, of 10 Hz. The energy of the laser beam can also be varied. The laser parameters should be selected by a skilled person so that the laser ablation process takes place for a particular sample, thereby generating an ablated sample material that can be effectively transported to the ambient pressure ion source that generates an ionized species from the ablated sample material. The spatial resolution of the laser sampling can, for example, be selected in a wide range between <1 μm up to 1000 μm by changing the spot size of the laser beam at the surface of the sample by at least one optical device within the beam such as, for example, via the aperture and/or focusing optics. In an embodiment, the laser may be a frequency quintupled Q-switched Nd:YAG laser operated at 213 nm and focused to spot sizes between 5 and 300 μm in diameter such as the LSX-213 (CETAC Inc., Omaha, Nebr., USA).

In an embodiment of the present invention, the apparatus can, for example, further comprise an optical device which is configured to focus the laser beam on a surface of the sample, and the laser ablation sampler can, for example, further comprise a stage which is configured to move the sample. At least one of the optical device and the stage can thereby be configured to position the laser beam with respect to the sample, and/or the sample with respect to the laser beam, so that the laser can irradiate and ablate the material from the sample at a desired local removal site within the laser ablation chamber.

In an embodiment of the present invention, the laser ablation chamber can, for example, comprise a gas inlet and a gas outlet. The gas inlet can, for example, be configured so that a flow of a gas can be applied thereto to control an atmosphere within the laser ablation chamber with respect to a gas composition and a gas pressure. The gas outlet can, for example, be configured so that the flow of gas through the laser ablation chamber transfers the ablated sample material towards each of the soft ionization source and the hard ionization source.

A volume of the sample subjected to radiation from the laser will interact with the laser beam and the energy absorbed from the laser beam so that, by rapid heating, a material from the interacting area will be released from the surface and expand into the ambient atmosphere as a mixture of gas, molten droplets, and small particulate matter altogether referred to herein as the ablated sample material. The composition of the ablated sample material and the distribution of the ablated sample material within the different phases (gas, molten, particles) depend on the composition and structure of the original sample, the laser parameters (wavelength, pulse duration, energy density etc.) and the atmosphere within the ablation chamber. Ambient conditions for the laser ablation can be controlled by selecting the composition of a gas within the ablation chamber, its pressure, temperature and/or flow. In an embodiment of the present invention, the laser ablation chamber can, for example, comprise a gas inlet and a gas outlet. The gas inlet can, for example, be configured so that a flow of a gas can be applied thereto so as to control an atmosphere within the laser ablation chamber with respect to a gas composition and a gas pressure. The gas outlet can, for example, be configured so that the flow of gas through the laser ablation chamber transfers the ablated sample material towards each of the soft ionization source and the hard ionization source via the transfer tube system. The gas used should be selected to support the ablation process and the formation of the ablated sample so that it is transportable towards the ion sources and supports, or does not interfere, with the ionization processes taking place at the ion sources. In an embodiment of the present invention, a noble gas such as argon can, for example, be used as the gas within the ablation chamber.

In an embodiment of the present invention, a gas mixture can, for example, be provided which at least one of supports and enhances an ionization efficiency of the ablated sample material.

In an embodiment of the present invention, the laser ablation chamber can, for example, further comprise a sample introduction port which is configured to automatically change the sample in the laser ablation chamber.

In an embodiment of the present invention, the transfer tube system can, for example, further comprise a flow splitter. The flow splitter can, for example, be configured to split a tube attached to the gas outlet into, for example, two connecting tubes, which connecting tubes are then respectively attached to the hard ionization source and to the soft ionization source. The connecting tubes between the flow-splitter and the sample injection ports of the hard ionization source and soft ionization source can have different lengths. This allows the elemental mass spectrometer and the molecular mass spectrometer to be placed at a distance from the laser ablation sampler. In an embodiment of the present invention, the connecting tube to the ICP torch may, for example, be a 2 m section of PA (4×1 mm) tubing, while the connecting tube to the soft ionization source may, for example, be a 0.5 m section of the same PA tubing.

In an embodiment of the present invention, the hard ionization source can, for example, be a plasma source configured to generate a kinetic gas temperature ≥2,000 K, for example, ≥2,250 K, for example ≥2,500 K, or, for example, ≥2,750 K.

In an embodiment of the present invention, the plasma source can, for example, be at least one of an inductively-coupled plasma (ICP) source, a microwave-induced plasma (MIP) source, a direct current plasma (DCP) source, and a laser-induced plasma (LIP) source.

In an embodiment of the present invention, the laser ablation sampler can, for example, be connected to more than one hard ionization source.

In an embodiment of the present invention, the hard ionization source can, for example, be a glow discharge.

In an embodiment of the present invention, the soft ionization source can, for example, be an ambient pressure ionization (API) source.

In an embodiment of the present invention, the ambient pressure ionization (API) source can, for example, be at least one of an atmospheric pressure chemical ionization (APCI) source, an atmospheric pressure photoionization (APPI) source, an atmospheric pressure laser ionization (APLI) source, a corona-type discharge source, and a low power plasma source.

In an embodiment of the present invention, one laser ablation system can, for example, be connected to more than one soft ionization source.

In an embodiment of the present invention, the elemental mass spectrometer can, for example, have a mass resolution ≤20,000, for example, ≤19,000, for example, ≤18,000 or, for example, ≤17,000, which supports the analysis of the elemental composition of the ablated sample material.

In an embodiment of the present invention, the elemental mass spectrometer can, for example be a quadruple mass spectrometer, a time-of-flight mass spectrometer, a magnetic sector field mass spectrometer, a magnetic sector field mass spectrometer in combination with an electrical field, or a multichannel instrument.

In an embodiment of the present invention, the molecular mass spectrometer can, for example, have a mass resolution of ≥10,000, for example, of ≥11,000, for example, of ≥12,000, or, for example, of ≥13,000, so as to support the identification of the ablated sample material by its exact mass.

In an embodiment of the present invention, the molecular mass spectrometer can, for example, be a time-of-flight mass spectrometer, an orbitrap-type mass spectrometer, a Fourier transform ion cyclotron resonance mass spectrometer, or a combination of at least one of the time-of-flight mass spectrometer, the orbitrap-type mass spectrometer, and the Fourier transform ion cyclotron resonance mass spectrometer with a quadruple mass analyzer.

The present invention also provides a method of analyzing a sample using the apparatus as recited above. The method includes providing a sample in the apparatus. A material is ablated from the sample with the laser so as to provide an ablated sample material as an aerosol. A flow of a gas is applied to transport the ablated sample material in parallel and simultaneously to each of the soft ionization source and to the hard ionization source. A species from the ablated sample material is desorbed and ionized with the soft ionization source to obtain a first ionized species, and a species from the ablated sample material is desorbed and ionized with the hard ionization source so as to obtain a second ionized species. The first ionized species is introduced into the molecular mass spectrometer, and the second ionized species is introduced into the elemental mass spectrometer. The first ionized species and the second ionized species are then separated by their mass-to-charge ratios.

In an embodiment of the present invention, the method can, for example, further comprise preforming a first pre-ablation to remove a cover material from a sample site covering the material to be analyzed. Chemical composition information for a subsurface material can thereby be obtained. This can be used to generate chemical composition depth profiles or even 3-D chemical composition maps.

In an embodiment of the present invention, the method can, for example, further comprise rastering the sample with the laser to map a sample composition for an imaging mass spectrometry. The laser thereby changes the location of an irradiated part of the sample. Changing the irradiated spot can also, for example, be realized by moving the sample relative to the laser beam, by moving the laser across the sample, and/or by guiding the beam towards different sample locations.

The apparatus and various embodiments will hereafter be described under reference to FIG. 1 in which a schematic diagram of an embodiment of an apparatus for mass spectrometry configured for analyzing a sample (6) by laser ablation coupled to an elemental mass spectrometer (12) and to a molecular mass spectrometer (18) is shown.

The apparatus for mass spectrometry comprises a laser ablation sampler (1), a hard ionization source for elemental mass spectrometry (11) operably connected to an elemental mass spectrometer (12), and a soft ionization source for molecular mass spectrometry (17) operably connected to a molecular mass spectrometer (18). The laser ablation sampler (1) includes an ablation chamber (5) which provides a controlled atmosphere surrounding the sample (6). The laser ablation sampler (1) further includes a laser (2) which generates a laser beam (3), which can be focused on to a sample surface (6) by means of one or more optical devices (4). By interaction of the laser beam (3) focused onto the surface of the sample (6), material is irradiated at the surface of the sample (6), and material is removed from the sample surface, thereby forming an aerosol of the ablated sample material spreading into the atmosphere of the ablation chamber (5). A transfer tube system (10) comprising a flow splitter (22) and connecting tubes (10') divides the flow of the ablated sample material so that it is fed to each of the hard ionization source (11) and the soft ionization source (17).

The laser ablation chamber (5) includes a gas inlet (8) and a gas outlet (9). The gas inlet (8) is configured so that a flow of a gas, such as argon, is applied to control an atmosphere within the laser ablation chamber (5) with respect to a gas composition and a gas pressure. The gas outlet (9) is configured so that the flow of gas through the laser ablation chamber (5) transfers the ablated sample material towards each of the soft ionization source (17) and the hard ionization source (11) via the transfer tube system (10).

A sample mapping is realized by an xyz-stage (7) which, for example, moves the ablation chamber (5) with the sample (6) relative to the laser beam (3) in any direction so that any location of the sample (6) placed within the ablation chamber (5) can be irradiated by the laser (2) to form an ablated sample material. The laser (2) can be operated in a pulsed mode, whereby the laser pulses are synchronized with the movement of the sample (6) in a spatial pattern so as to allow the mapping of a selected surface area for imaging mass spectrometry.

The shown hard ionization source (11) is an inductively coupled plasma source comprising a plasma torch (13), which generates a plasma (15) by inductively coupling energy into the plasma via a load coil (14) connected to a radio-frequency generator (not shown). The hard ionization source (11) interacts with the ablated sample material to generate an ion population having a mass-to-charge ratio distribution. The ion population is transmitted to the elemental mass spectrometer (12) via the elemental mass spectrometer entrance (16) so that the elemental mass spectrometer (12) provides information on the mass-to-charge ration distribution.

The soft ionization source (17) is an ambient pressure ion source comprising of an API probe (20) comprising a connection unit (19). The soft ionization source (17) interacts with the ablated sample material to generate an ion population having a mass-to-charge ratio distribution. The ion population is transmitted to the molecular mass spectrometer (18) via the molecular mass spectrometer entrance (21) so that the molecular mass spectrometer (18) provides information on the mass-to-charge ratio distribution.

The connection of the laser ablation sampler with two types of mass spectrometers provides surprising features. The three parts of the apparatus do not need to be incorporated into a single instrument, but can be placed relatively distant to each other. Ablated sample materials can be transported through the transfer tube system along a relatively long distance in the meter range. A contact closure or other trigger signal can furthermore be used to synchronize the ablation process and the data acquisition of the mass spectrometers, or the position of the laser beam on the sample can directly be used to map the corresponding intensities of the different m/z ratios. By combining both the information about the elemental and the molecular composition, both qualitative features of the ablated sample material, such as molecular structures, as well as quantitative features of the sample, such as stoichiometric elemental composition, can be obtained.

EXAMPLES

The following examples are provided to illustrate particular features of working embodiments.

The laser ablation sampler used was an LSX-213 (CETAC Inc., Omaha, Nebr., USA). The laser spot size was either 25 or 100 μm and the laser energy was adjusted to 10-20% of the maximum energy, fully ablating the respective samples. The scan rate was 25 or 50 μm/s in the y direction, depending on spot size, while the laser was operated at a repetition rate of 10 or 20 Hz.

Pure argon (Ar, purity 4.6) was used in these exemplary experiments to purge the ablation chamber and as a transport gas to transfer the ablated sample material towards the two ion sources. Polyamide (PA) tubing (4×1 mm) of 2 m length was used as a transfer line to connect the laser ablation sampler and the ICP used as the hard ionization source. Polyamide (PA) tubing (4×1 mm) of 0.5 m length was used as a transfer line to connect the laser ablation sampler and the APCI used as the soft ionization source. The total argon flow was 1 L/min.

An APCI source (IonMax, ThermoFisher Scientific, Bremen, Germany) with a discharge current of 4 μA was used as the soft ionization source. The ion source was connected to a high-resolution mass spectrometer (Exactive HCD, Thermo Fisher Scientific) operated in the positive ion mode with a full scan from m/z 100 to m/z 500 or 1000.

The inductively coupled plasma used as the hard ionization source was powered by a free-running radiofrequency generator delivering 1550 W of forward power. The ICP torch was operated with argon using a cool gas flow of 14 L/min, an auxiliary gas flow of 0.8 L/min, and a nebulizer gas flow of 0.72 L/min. Samples were injected into the plasma via a 1.8 mm i.d. quartz injector. The plasma was operated under wet plasma conditions using a cyclonic spray chamber cooled to 2.7° C. The plasma was interfaced to the mass spectrometer via a Ni sampler and skimmer cones (the skimmer cone having a 2.8 mm insert). The mass spectrometer (iCAP Q, Thermo Fisher Scientific) was operated in the KED cell mode (kinetic energy discrimination with a bias potential of 3 V between cell and quadruple mass analyzer), cell gas 5.9 mL/min (8% $H_2$ in He) and internal standards for parallel wet and dry aerosol introduction 5 μg/L of Sc and Y, internal standard uptake rate 300 μL/min, dwell times $^{27}$Al: 0.4 s, $^{79,81}$Br: 0.2 s, $^{45}$Sc, $^{89}$Y: 0.1 s. Each isotopic intensity was recorded with one channel.

Figure 2:
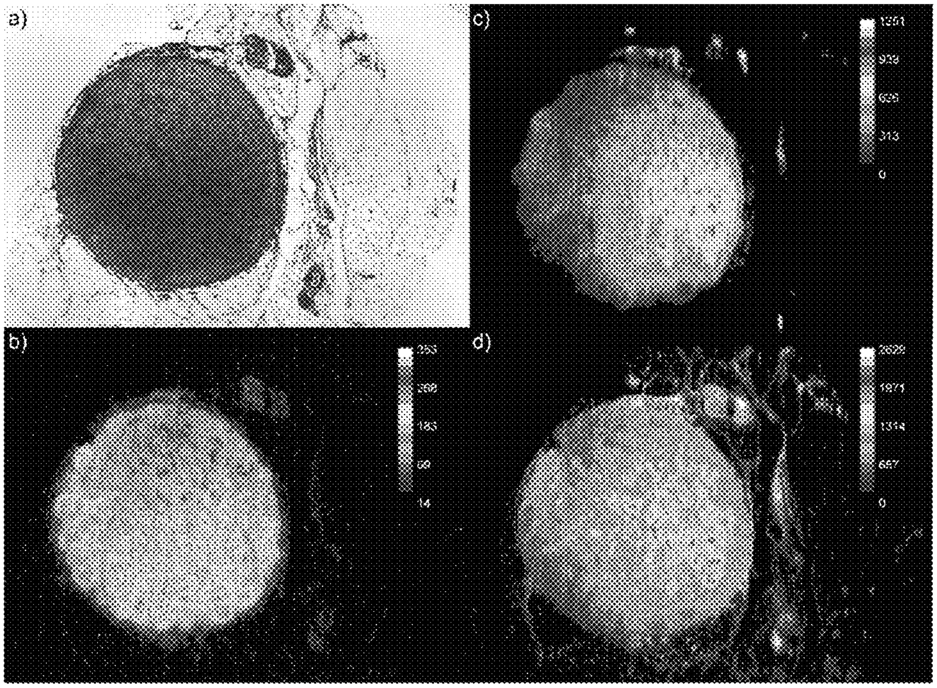
FIG. 2 shows images of hematoxylin/eosin (HE) stained human lymph node.

FIG. 2 shows images of a human lymph node stained with hematoxylin and eosin. This experiment demonstrates the possibility of simultaneously collecting both elemental and molecular composition data for mapping biological tissue samples by imaging mass spectrometry. The laser ablation sampler was operated with 20% laser energy, a spot size of 25 μm, a scanning rate of 25 μm/s, and a frequency of 20 Hz. The APCI-MS scan range was m/z 100-1000, and the monitored isotopes for ICP-MS were $^{27}$Al, $^{79}$Br, $^{81}$Br ($^{89}$Y, $^{45}$Sc as internal standards).

In FIG. 2, a) shows the optical microscopic image, b) shows the image of m/z 27 (Al) obtained by LA/ICP-MS, c) shows the ion image for m/z 648.6978-648.7307 (eosin $MH^+$) obtained by LA/APCI-MS, and d) shows the ion image of m/z 79 (Br) obtained by LA/ICP-MS.

This example shows that sufficient sensitivity can be obtained and that an excellent correlation exists between the optical image and the images obtained by LA/ICP-MS and LA/APCI-MS. Further confirmation is achieved due to the agreement of c) and d) in that the staining reagent eosin contains bromine.

Figure 3:
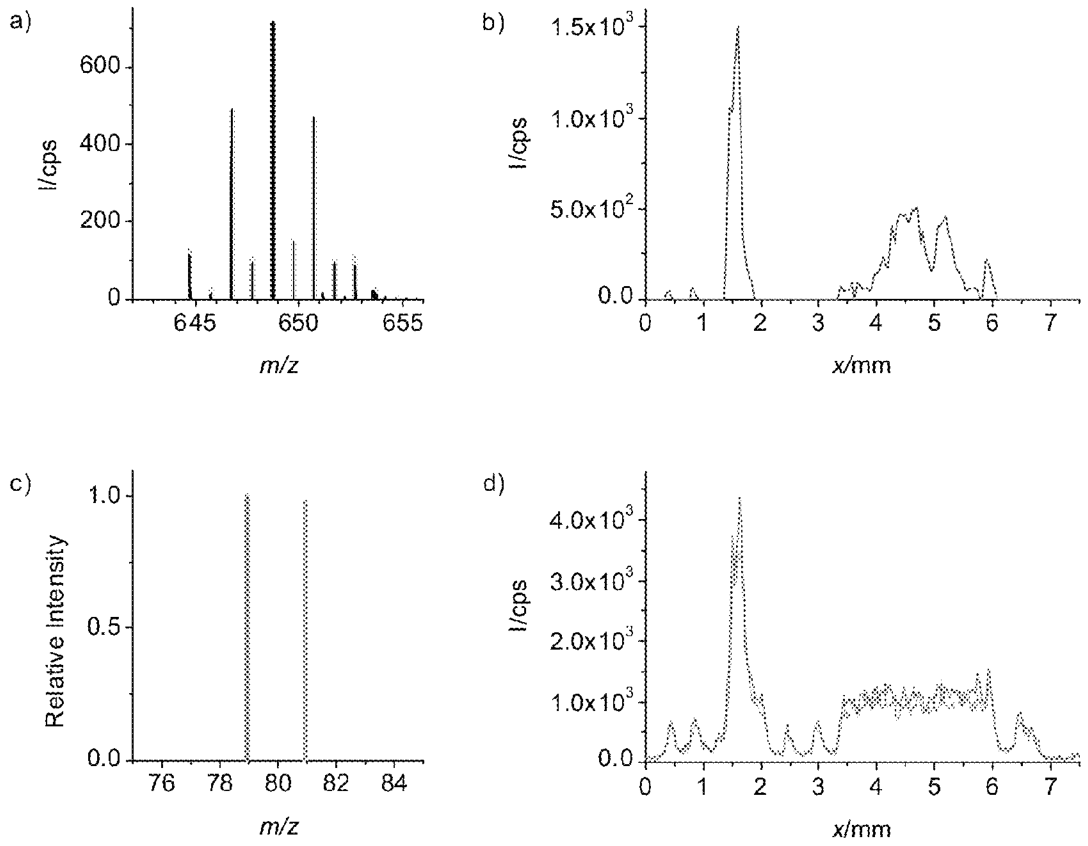
FIG. 3 shows the mass spectra obtained for a HE stained human lymph node by combined use of the LA/APCI-MS and LA/ICP-MS apparatus of the present invention.

FIG. 3 shows the mass spectra obtained for a HE stained human lymph node by combined use of LA/APCI-MS and LA/ICP-MS. In FIG. 3, a) shows the APCI mass spectra: calculated mass spectrum of eosin $MH^+$ and obtained mass spectrum at x=1.4-1.8 mm, y=5 mm (major signal m/z 648.7139 $\delta$=0.3 ppm to eosin $MH^+$), b) shows the ion trace for m/z 648.6978-648.7307 (eosin, $MH^+$) at y=5 mm obtained by LA/APCI-MS, c) shows the calculated ICP-MS mass spectrum of bromine ($^{79}$Br: green, $^{81}$Br: blue), and d) shows the traces for $^{79}$Br and $^{81}$Br at y=5 mm obtained by LA/ICP-MS.

Figure 4:
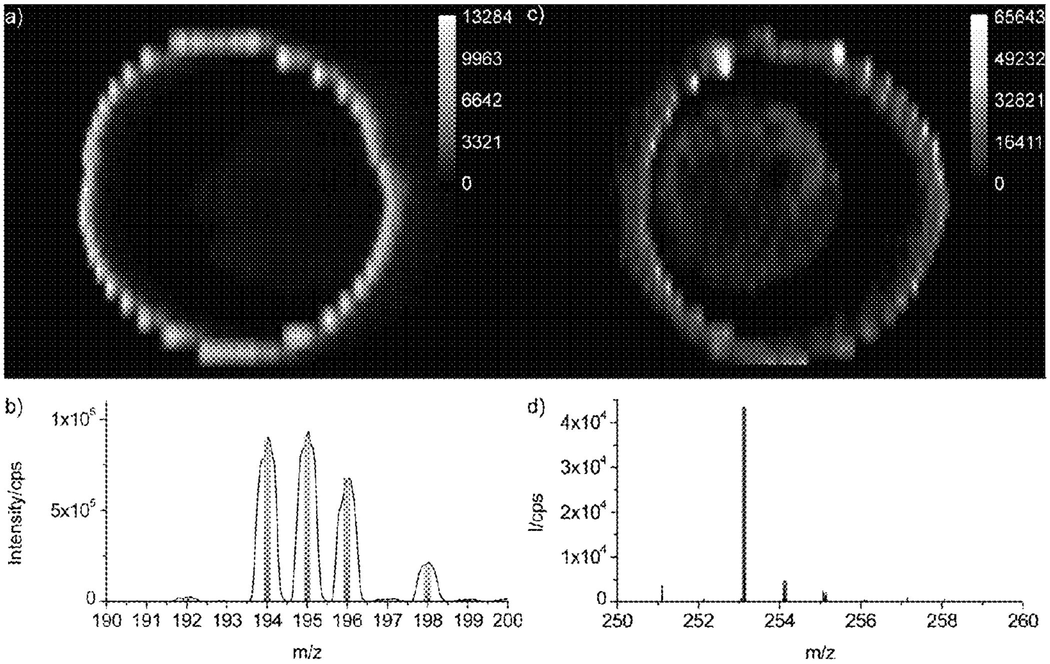
FIG. 4 shows the mapping of a dried droplet (2 μL) of cisplatin and cimetidin dosed onto a glass carrier by imaging mass spectrometry using the combined LA/APCI-MS/ICP-MS apparatus of the present invention.

FIG. 4 shows the mapping of a dried droplet (2 μL) of cisplatin and cimetidin dosed onto a glass carrier by imaging mass spectrometry using the combined LA/APCI-MS/ICP-MS apparatus. The droplet contained 2 fmol cisplatin and 7 nmol cimetidine. The laser ablation sampler was used in the multi-line scan mode with a spot size of 100 μm, a space of 10 μm between the lines, a laser energy of 10%, a scan rate of 50 μm/s and a laser frequency of 10 Hz. Carrier gas: Argon (1 L/min), split: T-Piece+0.5 m tubing (4×1 mm PA) to APCI and 2 m tubing (4×1 mm PA) to ICP.

APCI: positive ion mode, m/z 100-500, discharge current 4 μA.

ICP: power 1550 W (free running), cool gas 14 L/min, auxiliary gas 0.8 L/min, nebulizer gas 0.72 L/min, 1.8 mm quartz injector, Ni sampler, Ni skimmer with 2.8 mm insert, quartz cyclonic spray chamber @2.7° C., cell mode KED (kinetic energy discrimination with a bias potential of 3 V between cell and quadruple mass analyzer), cell gas 5.9 mL/min (8% $H_2$ in He), internal standards for parallel wet and dry aerosol introduction 5 μg/L of Sc and Y, internal standard uptake rate 300 µL/min, dwell times $^{27}$Al: 0.4 s, $^{79,81}$Br: 0.2 s, $^{45}$Sc, $^{89}$Y: 0.1 s, each isotope was detected with one channel.

In FIG. 4, a) shows the image of $^{195}$Pt obtained by LA/ICP-MS. The obtained map for Pt clearly shows the structure of the residue after drying of the droplet under formation of a ring structure. In FIG. 4, b) shows the mass spectra of platinum where the simulated mass spectrum of platinum is the light gray bars and the obtained (LA/ICP-MS) mass spectrum are the black lines. This clearly shows that the Pt signal was obtained interference free since the simulated isotopic distribution shown in the light ray bars perfectly matches the recorded (LA/ICP-MS) mass spectrum in black by means of a fast survey scan. The ion image of m/z 253.1169-253.1283 for cimetidine MH$^{+}$ obtained by LA/APCI-MS shown in c) reveals the same spatial structure as that one for Pt shown in a). The mass spectra of cimetidine as shown in d) exhibits a good correlation between the calculated mass spectrum of cimetidine MH$^{+}$ in the bars and the obtained (LA/APCI-MS) mass spectrum in black which all fall within the bars.

The examples shown in FIGS. 2, 3 and 4 clearly show that imaging mass spectrometry with two parallel mass spectrometers operated in parallel for the acquisition of elemental and molecular mass information can be achieved from the same sample location being probed with a laser ablation sampler. This approach has the unique advantage that the probed location is absolutely identical for both channels and the spatial resolution is only dictated by the spot size of the laser ablation sampler. There are many advantages of the present disclosure arising from the various features of the apparatus and methods described herein. Alternative embodiments of the apparatus and methods of the present disclosure may not include all of the features described above, yet still benefit from at least some of the features.

The present invention is not limited to embodiments described herein; reference should be had to the appended claims.

What is claimed is:

1. An apparatus for mass spectrometry, the apparatus comprising:
- a laser ablation sampler comprising a laser ablation chamber and a laser configured to produce a laser beam, the laser ablation chamber being configured so that the laser can irradiate and ablate a material from a sample placed within the laser ablation chamber so as to generate an ablated sample material;
- a soft ionization source;
- a molecular mass spectrometer comprising a molecular mass spectrometer entrance, the molecular mass spectrometer being operatively connected with the soft ionization source;
- a hard ionization source;
- an elemental mass spectrometer comprising an elemental mass spectrometer entrance, the elemental mass spectrometer being operatively connected with the hard ionization source;
- a transfer tube system comprising connecting tubes configured to connect the laser ablation sampler with, and to provide a parallel and simultaneous transport of the ablated sample material to, each of the soft ionization source and the hard ionization source, wherein,
- the soft ionization source interacts with the ablated sample material to generate a first ion population having a first mass-to-charge ratio distribution, the first ion population being transmitted to the molecular mass spectrometer via the molecular mass spectrometer entrance so that the molecular mass spectrometer provides information on the first mass-to-charge ratio distribution,
- the hard ionization source interacts with the ablated sample material to generate a second ion population having a second mass-to-charge ratio distribution, the second ion population being transmitted to the elemental mass spectrometer via the elemental mass spectrometer entrance so that the elemental mass spectrometer provides information on the second mass-to-charge ration distribution, and
- the first mass-to-charge ratio distribution obtained from the molecular mass spectrometer and the second mass-to-charge ratio distribution obtained from the elemental mass spectrometer are each used to characterize a composition of the ablated sample material.

2. The apparatus as recited in claim 1, wherein the laser operates in at least one of a ultra-violet wavelength range, an infrared wavelength wave, and in a visible wavelength range.

3. The apparatus as recited in claim 1, wherein the laser further comprises a pulsed mode of emission operating in a femtosecond range, a picosecond range, or in a nanosecond range.

4. The apparatus as recited in claim 1, further comprising:
- an optical device configured to focus the laser beam on a surface of the sample, wherein,
- the laser ablation sampler further comprises a stage configured to move the sample, and
- at least one of the optical device and the stage are configured to position the laser beam with respect to the sample and/or the sample with respect to the laser beam so that the laser can irradiate and ablate the material from the sample at a desired local removal site within the laser ablation chamber.

5. The apparatus as recited in claim 1, wherein the laser ablation chamber comprises a gas inlet and a gas outlet, the gas inlet being configured so that a flow of a gas can be applied thereto to control an atmosphere within the laser ablation chamber with respect to a gas composition and a gas pressure, and the gas outlet being configured so that the flow of gas through the laser ablation chamber transfers the ablated sample material towards each of the soft ionization source and the hard ionization source.

6. The apparatus as recited in claim 5, wherein a gas mixture is provided as the gas which at least one of supports and enhances an ionization efficiency of the ablated sample material.

7. The apparatus as recited in claim 5, wherein the laser ablation chamber further comprises a sample introduction port configured to automatically change the sample in the laser ablation chamber.

8. The apparatus as recited in claim 1, wherein the transfer tube system further comprises a flow splitter.

9. The apparatus as recited in claim 1, wherein the hard ionization source is a plasma source configured to generate a kinetic gas temperature ≥2,000 K.

10. The apparatus as recited in claim 9, wherein the laser ablation sampler is connected to more than one hard ionization source.

11. The apparatus as recited in claim 9, wherein the hard ionization source is a glow discharge.

12. The apparatus as recited in claim 1, wherein the soft ionization source is an ambient pressure ionization source.

13. The apparatus as recited in claim 12, wherein one laser ablation system is connected to more than one soft ionization source.

14. The apparatus as recited in claim 1, wherein the elemental mass spectrometer has a mass resolution ≤20,000.

15. The apparatus as recited in claim 1, wherein the molecular mass spectrometer has a mass resolution of ≥10,000.

16. A method of analyzing a sample using the apparatus as recited in claim 1, the method comprising:

providing a sample in the apparatus;

ablating a material from the sample with the laser so as to generate the ablated sample material as an aerosol;

applying a flow of a gas to transport the ablated sample material in parallel and simultaneously to each of the soft ionization source and the hard ionization source;

desorbing and ionizing a species from the ablated sample material with the soft ionization source to obtain a first ionized species, and desorbing and ionizing a species from the ablated sample material with the hard ionization source so as to obtain a second ionized species;

introducing the first ionized species into the molecular mass spectrometer, introducing the second ionized species into the elemental mass spectrometer; and separating the first ionized species and the second ionized species by their mass-to-charge ratios.

17. The method as recited in claim 16, further comprising preforming a first pre-ablation to remove a cover material from a sample site covering the material to be analyzed.

18. The method as recited in claim 16, further comprising rastering the sample with the laser to map a sample composition for an imaging mass spectrometry.

19. The method as recited in claim 16, further comprising characterizing a composition of the ablated sample material from the mass-to-transfer ratios.

* * * * *